Sept. 18, 1928.

E. T. FERNGREN 1,684,437

SHEET DRAWING APPARATUS

Filed Dec. 23, 1924

2 Sheets-Sheet 1

INVENTOR.
Enoch T. Ferngren.

Frank Fraser
ATTORNEY.

Sept. 18, 1928.

E. T. FERNGREN 1,684,437

SHEET DRAWING APPARATUS

Filed Dec. 23, 1924

2 Sheets-Sheet 2

INVENTOR.
Enoch T. Ferngren.
Frank Fraser
ATTORNEY.

Patented Sept. 18, 1928.

1,684,437

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

SHEET-DRAWING APPARATUS.

Application filed December 23, 1924. Serial No. 757,606.

The present invention relates to sheet glass drawing apparatus, and has particular reference to a continuous machine wherein a sheet of glass is drawn from a source of molten glass.

An object of this invention is to provide sheet glass apparatus of this nature wherein a sheet of glass may be drawn from a pool of molten glass for a long period without the necessity of interrupting the operation to recondition the glass of the pool, said sheet being also relatively flatter and smoother than the glass heretofore drawn by any related method.

A further object of the invention is to provide means for drawing a sheet vertically from a source of molten glass wherein the glass is heated to a high temperature and maintained at such a temperature until it is in the vertical draw, after which the glass, which is in sheet formation, is lowered in temperature to prevent breaking down of the same as it is drawn from its source.

Other objects and advantages of the invention will become apparent during the course of the following description.

Figures 1, 2:
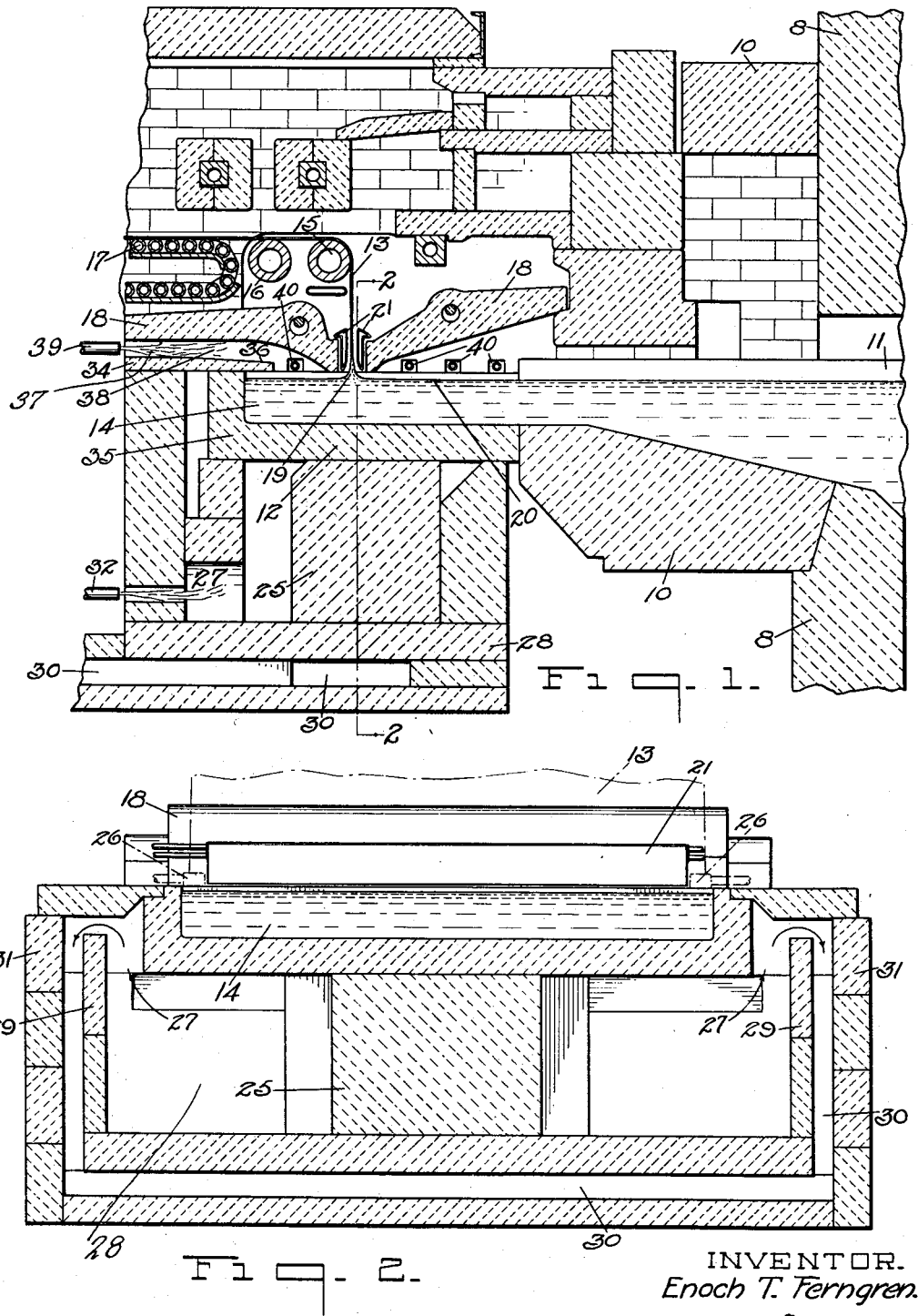
Figure 3:
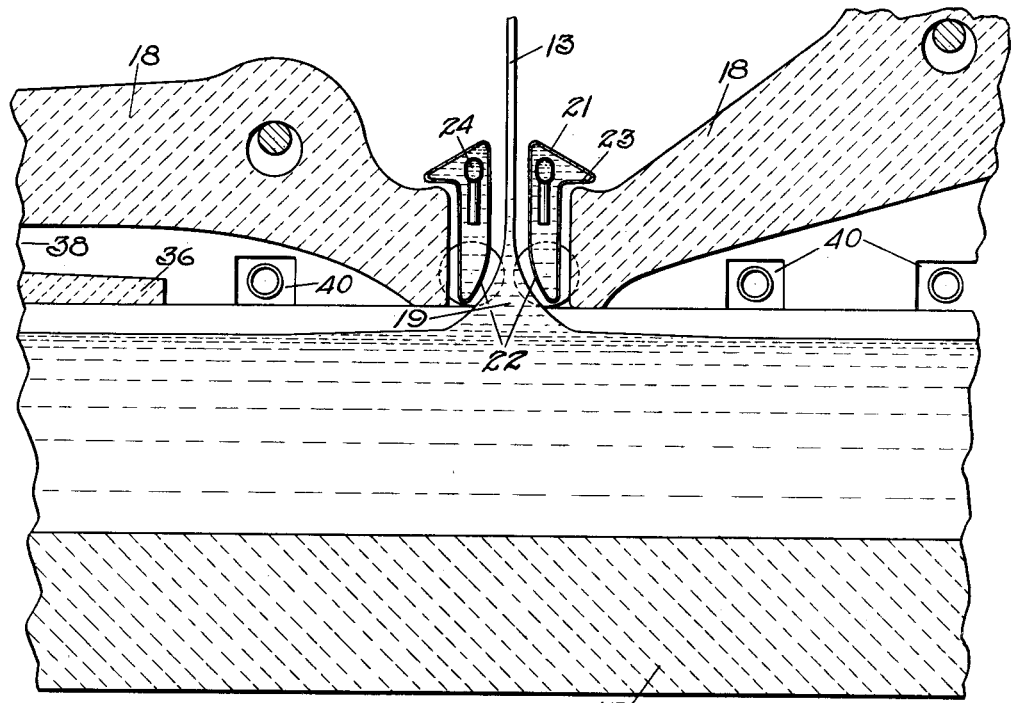
Figure 4:
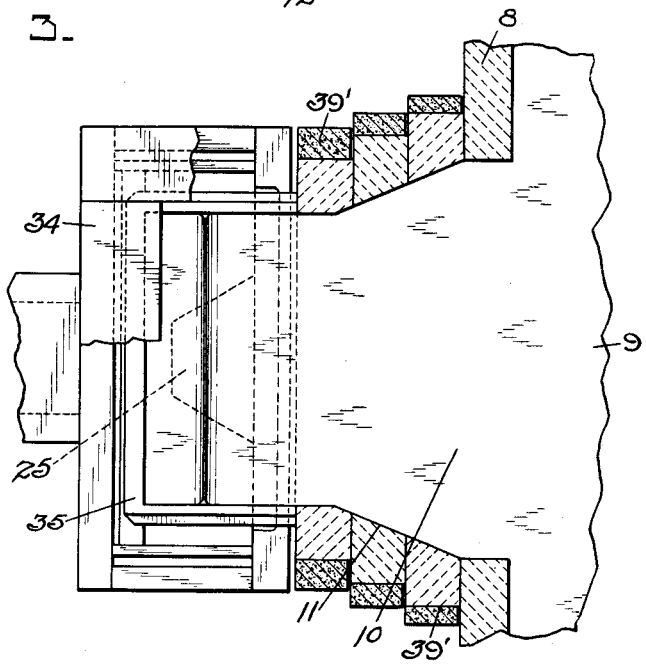

In the drawings wherein like numerals are employed to designate like parts throughout the same, Fig. 1 is a fragmentary longitudinal vertical section through a portion of the machine, Fig. 2 is a section on line 2—2 of Fig. 1, Fig. 3 is an enlarged sectional view illustrating the position of the coolers in accordance with the present invention, Fig. 4 is a top plan view of the drawing apparatus.

In the drawings wherein for the purposes of illustration is shown the preferred embodiment of the invention, the numeral 8 designates a tank furnace in which a quantity of glass 9 is conditioned, and is passed through a delivery channel 10, said channel having all of its walls 11 placed at angles so as to catch the heat from the furnace, and communicating with a draw-pot 12, as is clearly shown in Figs. 1 and 4. A sheet of glass 13 is drawn vertically from the bath of glass 14 in the draw-pot 12, and is passed over a bending roll 15 whereby the sheet is deflected into the horizontal plane and is passed over an idler roll 16, flattening table 17 and through an annealing leer.

The type of apparatus used in this process is in part disclosed in the patent to Colburn, 1,248,809, granted December 4, 1917, although it is not necessarily restricted to the exact machine disclosed in this patent. In the machines now in use utilizing the Colburn process, cover-tiles or lip-tiles 18 are arranged above the draw-pot 12 and are used for deflecting heat currents or the like downwardly toward the surface of the glass from which the sheet is drawn, thus utilizing heat from the furnace to maintain a high temperature in the glass and also to partially protect the sheet 13 after it has been drawn from the pot. The coolers disclosed in this patent are arranged a substantial distance from the sheet 13, and are also disposed as close as possible to the surface of the glass in the pot.

As is shown in Figs. 1 and 3, a meniscus 19 is formed by the drawing action and is termed in the art as a sheet source. The sheet source usually has a very broad base, generally induced by the preceding cooling chamber treatment of the glass, which necessitated a relatively large spacing between the sheet 13 and the said coolers.

In accordance with the present invention, I have designed coolers capable of being placed relatively close to the sheet being drawn, while at the same time I have positioned the lower edges thereof relatively further away from the surface 20 of the glass 14 in the pot 12.

As is more clearly shown in Fig. 3 the lip-tiles 18 have been considerably lengthened as compared with the lip-tiles set forth in the Colburn patent.

The coolers 21 are preferably formed from a non-corrosive metal and are provided with curved ends 22 to permit the cooler to be positioned relatively close to the sheet 13, while at the same time the end 22 will not contact or interfere with the sheet source 19. The upper ends of the coolers 21 are provided with an extension 23 which overhangs in spaced relation the ends of the lip-tiles 18. A cooling medium is introduced within coolers 21 by means of a pipe 24 in a manner that a cooling medium is continuously introduced centrally and passed through the coolers for the purposes of absorbing heat from the sheet 13.

Due to the shape and position of the coolers as designed in the present invention and the lengthening out of the lip-tiles 18, it is possible to utilize the heat currents given off or received from the tank furnace 8 to keep the glass in the pot 12 at a high temperature a relatively high distance up the sheet source 19. The cooler 21 is slightly spaced from the end of the lip-tile 18, thus forming a flue for the escape of the heat currents utilized in keeping the glass in the pot at a high temperature. This flue action obviates to a great extent the possibility of heat currents passing up between the sheet and the inner edge of the coolers, thus permitting a greater amount of heat absorption from the sheet than would otherwise be possible. Due to the extension 23 formed on the cooler, the heat currents will be drawn away from the sheet, thus allowing the sheet to be drawn from a hot body of glass and rapidly cooled so that it will not break down after it has once left the sheet source.

Due to the space between the surface of the glass in the pot and the lower edge of the cooler 21, the cooling action will not begin on the sheet source until the sheet source is substantially in a vertical position.

As is known in the art in the present form of drawing apparatus, the molten glass from which the sheet is drawn is relatively hotter in the center than along the border portions of the pot, while at the same time the flow is of greater rapidity in the center. This is because of the heat absorption occasioned by the edges of the pot and also because of the inherent tendency of the molten glass to adhere or cling to substances such as the pot is formed from. The cooler action as utilized in the prior art forms what may be termed a blanket of plastic glass having a skin of rather tough nature which forms the upper surfaces of the molten glass in the draw-pot. Due to the variance in speed of the flow of the glass the plastic layer between the points where it is formed and where it finally is drawn into the sheet is somewhat twisted and pulled unevenly, causing the layer to gather into wrinkled submerged thick and thin portions, thus producing or giving one of the reasons why sheet glass drawn in this manner is not entirely flat and smooth and free from waves.

In the present case I endeavor to prevent the formation of a plastic layer and skin which would have a tendency to become tractile and pull unevenly by keeping the surface glass in the pot hot right up to the point where it is in the vertical draw of the sheet source and about to enter into sheet formation. By rapidly cooling this smooth and flat surface glass at this point it is possible to give a much flatter and smoother sheet.

To further assist in the proper conditioning of the glass, I change the pot support from that now in use to a substantially wedge-shaped deflection block support 25, which is so constructed that the edge portions of the pot will be heated more than the center portions underneath so that the glass temperature in the pot will be more equalized than without such a structure.

As shown in Fig. 2 the coolers 21 are not quite as long as the width of the sheet 13 being drawn, thus permitting the use of knurled rollers or the like 26 along the edges of the sheet source to build up relatively heavier edge portions on the sheet being drawn capable of maintaining the sheet to width.

In order to increase the intensity and positiveness of heat volume outside the side walls of the draw-pot, to thereby insure that none or at least very little of the originally contained heat in the side portions of the glass body in the pot, will be lost, the heating gaseous atmosphere 27 of the heating chamber 28 under the pot, is caused to move toward the upper end of the inner side wall 29 of the heating chamber, and then downward and outward through flue passages 30 which are formed between the walls 29 and the outer side walls 31 of the chamber.

The fuel of gas and air is delivered into the chamber 28 by means of a series of nozzles or burners 32, and as combustion occurs and the heat releasing atmosphere is established the burning gases are crowded toward the side walls 29 by the deflection block 25, which block also serves as a support for a considerable area of the central portion of the bottom of the pot 12, thus materially strengthening the pot by taking the greater portion of its load, which in the case of a wide pot, is considerable.

The tile 34 serves to form a tight cover over the heating chamber space forward of the closed end wall 35 of the pot 12 by reason of which a positive heat releasing center is established which has a very high temperature efficiency and buoyancy of atmosphere, and which is always entrapped at this end wall of the pot, and sealed up so that no cold air current will be attracted or caused to shift under the adjacent lip-tile 18 to enter the heating chamber from this point and prematurely cool any portion of the exposed glass in this end of the pot 12.

The end portion 36 of the cover-tile 34 functions as a shade plate over the surface and body portion of the glass 14 which lies adjacent the wall 35 of the pot 12 for the purpose of protecting the glass surface at this point from a too direct contact with the heating atmosphere 37 before combustion is well completed. This atmosphere is projected into the heating space 38 under the lip-tile 18 at this end of the pot by the series of burners 39.

As shown in Fig. 1, the space 38 is relatively long and narrow, and also originally highly heated by radiation from the heating chamber 28, which promotes rapid combustion and expansion of the heating atmosphere 37, so that by the time it reaches the lower tip of the tile 18 adjacent the meniscus its heating efficiency and pressure is high, which further prevents cold air currents from entering the space 38.

The end 36 of the tile 34 collects considerable heat and acts as a radiant heater for the glass adjacent the wall 35, thus preventing solutional changes in the composition of the glass by maintaining the same constant release and passage of heat energy therethrough from all sides as is maintained in the normal melting and refining tanks.

It should be noted that the delivery channel 10 is not a cooling chamber but that all its features are adapted to cause and maintain an active play of furnace heat energy in and through the glass body moving therefrom into the pot 12.

The glass in the pot 12 from which the sheet is drawn is thus surrounded on all sides by positive heat zones which deliver radiant heat toward the glass body in the pot 12 in all directions in sufficient amounts to keep the glass alive in the sense of preventing crystallization and stratified assembling of different solutional properties; also the replacing stream movement of the glass to the point of draw is now more inclusive. The walls 11 of the delivery channel 10 are turned at such angles to the radiant heat of the furnace 8 that very little loss of heat and glass stagnation will be coincident at the side of the sheet supplying current.

The insulation blocks 39', see Fig. 4, also contribute to raise the temperature in the walls 11.

The general effect of the various features is to serve the sheet 13 with a glass of uniform viscosity which is made uniformly tractile at the point of draw only, and readily picked up in uniform volume, without being subjected to different resistance strain having no horizontal movement toward the point of draw while in a tractile condition. The burners 40 are auxiliary means for raising the temperature and effectiveness of the atmosphere under the lip-tiles 18 and to heat the side portions of the glass surface adjacent the side walls of the pot 12 when occasion demands.

Claims:

1. In sheet glass apparatus, means to draw a sheet of glass from a source of molten glass, including a sheet supplying meniscus, and heat absorbing means positioned on both sides of the sheet and having a curved end whereby the said means can be placed relatively close to the sheet without interference to the sheet supplying meniscus, the lower extremity of the heat absorbing means being a substantial distance from the base of the said sheet supplying meniscus.

2. In sheet glass apparatus, means to draw a sheet of glass from a source of molten glass, including a sheet supplying meniscus, heat absorbing means arranged in close proximity to the sheet being drawn and having a curved end of substantially the same curvature as the sheet supplying meniscus and being disposed a substantial distance above the base thereof, and means to prevent hot air currents from striking the sheet in its vertical draw.

3. In sheet glass apparatus, means to draw a sheet of glass from a source of molten glass, including a sheet supplying meniscus, cover-tiles arranged above the said source and on both sides of the sheet being drawn, and heat absorbing means interposed between the cover-tiles and sheet in close proximity to the sheet and having a curved end of substantially the same curvature as the sheet supplying source and disposed a substantial distance above the base thereof, the said heat absorbing means and cover-tiles forming a flue for the escape of heat currents.

4. In sheet glass apparatus, means to draw a sheet of glass from a source of molten glass, including a sheet supplying meniscus, cover-tiles arranged above the source and on both sides of the sheet being drawn, and heat absorbing means interposed between the cover-tiles and sheet in close proximity to the sheet, and having a curved end of substantially the same curvature as the sheet supplyng source and disposed a substantial distance above the base thereof and entirely out of contact with the glass, and means for removing heat currents from the base of the sheet supplying meniscus.

5. In sheet glass apparatus, means to draw a sheet of glass from a source of molten glass, including a sheet supplying meniscus, cover-tiles arranged above the molten glass and on both sides of the sheet being drawn, positive heating means also positioned above the molten glass at opposite sides of the sheet, and coolors arranged between the sheet and the cover-tiles in a manner to create a flue for removing heat currents from near the base of the sheet supplying meniscus.

6. In the art of producing sheet glass, the method which consists in drawing a sheet from a source of molten glass, including a sheet supplying meniscus, heating the source of molten glass at opposite sides of the sheet to a high temperature up to and including the lower portion of the sheet supplying meniscus, and then rapidly lowering the temperature of the upper portion of the meniscus and lower portion of the sheet.

7. In the art of producing sheet glass, the method which consists in drawing a sheet from a source of molten glass, including a sheet supplying meniscus, heating the source of molten glass by positive heating means from above at opposite sides of the sheet to a high temperature up to and including a portion of the sheet supplying meniscus, and then rapidly lowering the temperature of the glass above this point.

8. In the art of producing sheet glass, the method which consists in drawing a sheet from a source of molten glass, including a sheet supplying meniscus, heating the source of molten glass to a relatively high temperature, and in then lowering the temperature of the sheet supplying meniscus, while directing the heat currents from near the base of said meniscus upwardly and away from said sheet.

9. In the art of producing sheet glass, the method which consists in drawing a sheet from a source of molten glass, including a sheet supplying meniscus, heating the source of molten glass by positive heating means from above at opposite sides of the sheet to a high temperature up to and including a portion of the sheet supplying meniscus, and then rapidly lowering the temperature of the glass above this point, while directing the heat currents from near the base of the meniscus upwardly and away from the sheet.

10. In sheet glass apparatus, means to draw a sheet of glass from a source of molten glass, including a sheet supplying meniscus, cover tiles arranged above the molten glass and on both sides of the sheet being drawn, coolers arranged between the sheet and the cover tiles in a manner to create flues for removing heat currents from near the base of the sheet supplying meniscus, and means at the upper end of the coolers for directing the heat currents passing upwardly through the flues away from the sheet.

11. In sheet glass apparatus, means to draw a sheet of glass from a source of molten glass, including a sheet supplying meniscus, cover tiles arranged above the molten glass and on both sides of the sheet being drawn, positive heating means also positioned above the molten glass at opposite sides of the sheet, coolers arranged between the sheet and the cover tiles in a manner to create flues for removing heat currents from near the base of the sheet supplying meniscus, and means for directing the heat currents passing upwardly through the flues away from the sheet.

12. In sheet glass apparatus, means to draw a sheet of glass from a source of molten glass, including a sheet supplying meniscus, and heat absorbing means arranged on both sides of the sheet and each being provided with a lateral extension at its upper end and having a portion of its lower end adapted to fit substantially in the curvature of said sheet supplying meniscus.

13. A cooler for use in sheet glass apparatus comprising a hollow body provided with a lateral extension at its upper end and having a portion of its lower end curved.

Signed at Toledo, in the county of Lucas, and State of Ohio, this 18th day of December, 1924.

ENOCH T. FERNGREN.